No. 897,436. PATENTED SEPT. 1, 1908.
H. WATKINS.
LAWN TRIMMER.
APPLICATION FILED OCT. 7, 1907.
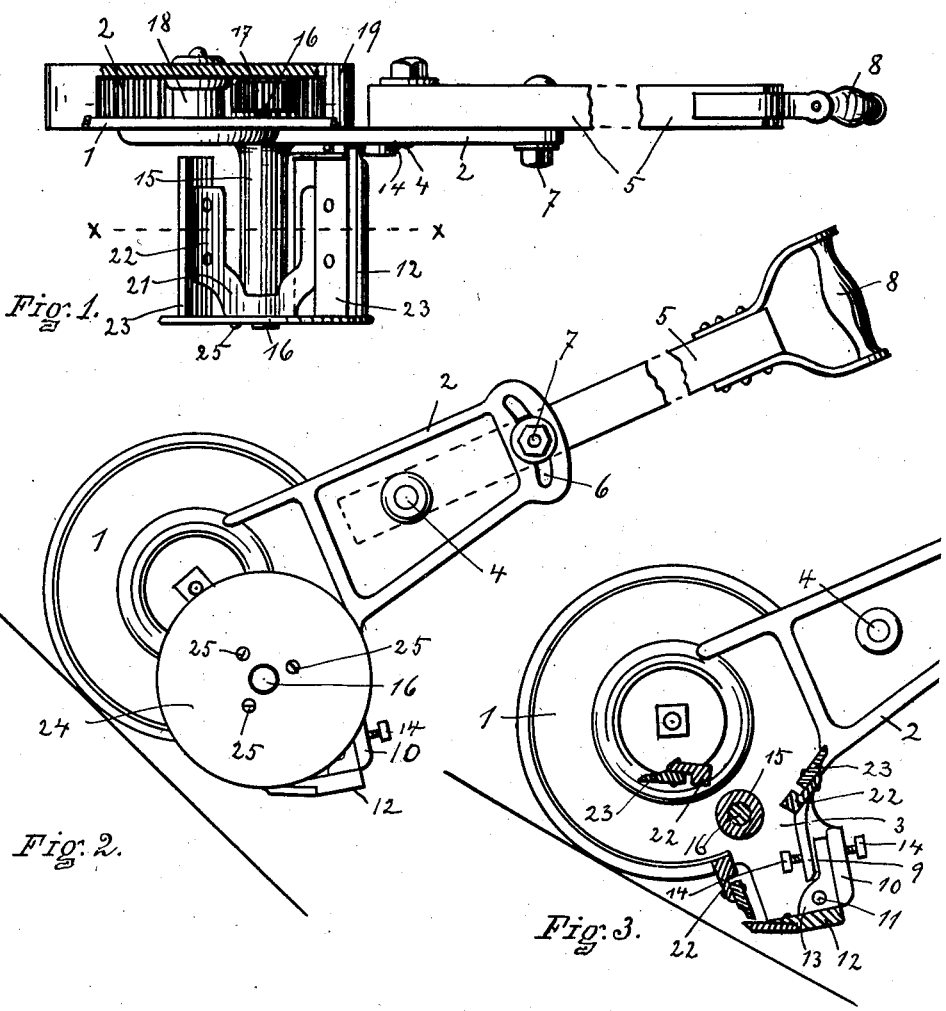
WITNESSES
Rich. A. George
E. P. De Giorgi
INVENTOR
HARRY WATKINS.
BY Risley Love
ATTORNEYS.

UNITED STATES PATENT OFFICE.

HARRY WATKINS, OF UTICA, NEW YORK, ASSIGNOR OF ONE-HALF TO JOHNSON C. DEWHURST, OF DEERFIELD, NEW YORK.

LAWN-TRIMMER.

No. 897,436.     Specification of Letters Patent.     Patented Sept. 1, 1908.

Application filed October 7, 1907. Serial No. 396,197.

*To all whom it may concern:*

Be it known that I, HARRY WATKINS, a citizen of the United States, residing at Utica, in the county of Oneida and State of New York, have invented certain new and useful Improvements in Lawn-Trimmers, of which the following is a specification, reference being had therein to the accompanying drawing.

My invention relates to an improved lawn trimmer, and I declare that the following is a full, clear, concise, and exact description thereof, sufficient to enable one skilled in the art to make and use the same, reference being had to the accompanying drawings in which like reference numerals refer to like parts throughout.

The invention is disclosed in the form of an implement for use in trimming the edges of lawns, adjacent walks, gardens, fences, monuments and the like, whereby the device can be passed close along the edge and be tilted to any desired angle for the degree of trim to be made.

The form here shown comprises a frame mounted on a handle, with a stud projecting therefrom. On one side of the frame are mounted the cutting members and on the other side is means for actuating the same through the operation of the riding wheel.

Other features of the invention will appear from the drawings and specifications, in the former of which Figure 1 is a top view of the device with a portion of the riding wheel broken away and a portion of the handle removed; Fig. 2 is a view from the side which carries the cutting members, with part of the handle removed; and Fig. 3 is a like view of the machine on the line *x—x* of Fig. 1.

Referring to the figures in detail, 1 is the frame, the body of which is formed in a flat disk, from one side of which extends the bracket 2 for the mounting of the handle and from which at another point extends the knife-bracket 3. The handle bracket 2 consists of an arm pierced, as at 4, for a bolt to secure the wooden handle 5, and having in its extremity a segmental slot 6 with bolt 7 by which the handle 5 can be secured in adjustment for the operator conveniently to drive the machine with a greater or less elevation of the cutting knives above the surface. The handle 5 is provided at its end with a grip 8 to permit the operator conveniently to tilt the machine on its riding or traction wheel, so as to cut the edge of the lawn on a greater or less bevel, it being, of course, understood that by raising the handle the machine can be tilted sidewise a greater extent than when the handle is lower. The raising of the hand of the operator and the tilting of the machine on the riding wheel coöperate to make this possible. The machine also can be operated for a greater or less length of cut by simply raising the handle so as to lift the cutting device more or less above the surface, as shown comparatively in Figs. 2 and 3.

The knife bracket 3 extends from the frame 1 downwardly and has two elevated ribs or lugs, 9 and 10, and a stud 11 (Fig. 3) by means of which the fixed blade 12 is mounted rigidly with the frame, the blade 12 having a lug 13 which is pierced to be swingably mounted on the pin or stud 11, the adjustment being fixed by means of set-screws 14. The blade 12 projects outwardly, as seen in Fig. 1, to coöperate with the revolving blades to be described.

Adjacent the periphery of the disk portion of the frame is a sleeve 15 in which is revolubly mounted the stud 16 which carries the pinion 17, the stud 16 and the pinion 17 forming parts of the operative mechanism. Centrally mounted on the frame disk is stud 18 on which is revolubly mounted the riding or traction wheel 19, the periphery of which is transversely corrugated as is commonly done, and the wheel having an interior gear 20 to engage with the pinion 17 so that the movement of the device on the wheel revolves the stud 16. On the outer end of the stud is secured a knife-spider 21 which comprises a head portion by which it is mounted on the stud and blade supports 22 which extend from the head substantially parallel to the studs 15 and 16. There are three of these blade supports 22, as will be seen in Fig. 2. They are not exactly parallel with the studs, but are formed somewhat spirally thereto as commonly seen in devices where there are revolving blades, so that one end of each blade meets the fixed cutting blade 12 before the other end does. Each of these blade supports, of which three are shown, carries a blade 23 fixedly mounted thereon. It will be seen that the device thus comprises a frame with studs to carry revolving knives and a traction or riding wheel by which it is operated, with operative connections therebetween, and that pushing or pulling the device over the ground will revolve the blades in the direction in which the riding wheel turns.

It will be seen that so far as the construction has been described the tilting of the same is apt to drive the free end of the blades into the ground or, for instance, against the surface of the adjacent walk or into other obstructions. I provide against any damage in this way by mounting a disk 24 on the spider or otherwise by means of screws 25, the disk being of the same diameter as the circle in which the edge of the revolving blades travel, the relative mounting of the several parts being such that the periphery of the disk in the ordinary use of the machine will strike for instance the surface of the walk and keep the knives therefrom, and will also prevent gouging of the lawn no matter to what extent or howsoever the device may be tilted or otherwise handled.

It will be apparent that modifications in the details of construction may be made in the device without departing from the spirit and scope of the invention, which I have shown in a single embodiment.

Having described my invention, what I claim as new and desire to secure by Letters Patent, is:

1. A device of the character described having a frame, an integral sleeve projecting laterally therefrom, with a free end, a blade-supporting frame having a portion mounted in the sleeve with its arms extended alongside the sleeve and adapted to support blades thereon, the said member having a guard comprising a disk mounted at the outer ends of the blades and beyond the end of the fixed blade, substantially as set forth.

2. A device of the character described having a frame, a handle mounted thereon, a sleeve projecting laterally from the frame and supported only at one end on the frame, a shaft mounted in the sleeve and projecting therefrom, horizontally disposed revolving cutting members mounted on the projecting end of the shaft, a bracket, a fixed blade adjustably mounted on the bracket extended outwardly beyond the edge of the frame in coöperation with the revolving cutting members, and means for revolving said cutting members, substantially as set forth.

3. In a device of the character described, the combination with a frame having integral therewith a handle-lug, a knife-supporting bracket with knife adjustments thereon, a sleeve and a wheel-stud, of a handle adjustably mounted on the handle-lug, a wheel with interior gear teeth mounted on the stud, a fixed blade mounted on the bracket so as to be adjusted thereon to adjust the edge of said blade vertically, and a stud mounted in the sleeve having a pinion at one end to engage the wheel teeth and at the outer end of the sleeve having blade-supporting arms extending backward toward the frame and blades supported thereon, substantially as set forth.

4. A device of the character described having a frame, an integral sleeve projecting laterally therefrom, with a free end, a blade-supporting frame mounted in the sleeve with its arms extended alongside the sleeve and adapted to support blades thereon, substantially as set forth.

5. A device of the character described having a single traction wheel whereby to ride and operate the device, a sleeve mounted at one end only on the said device and projecting laterally therefrom with the outer end free, and cutting members mounted to revolve around said sleeve and extending alongside thereof, whereby the tilting of the device on the wheel is operative to control the plane of work in the cutting operation, substantially as set forth.

6. In a device of the character described, a frame, a blade pivotally mounted on the frame and projecting outwardly therefrom in an unsupported end, means on the frame to adjust said blade, a sleeve integral with the frame projecting likewise with its end unsupported, a shaft in the sleeve and cutting members mounted on the shaft to revolve around the sleeve and supported solely by the shaft, in combination with means for rotating the cutting members, substantially as set forth.

7. In a device of the character described, a frame, a sleeve thereon, a stud revoluble in the sleeve and cutting members supported at the outer end of the stud, a fixed blade, the said members having a guard comprising a disk mounted on the outer ends of the cutting members and beyond the end of the fixed blade, substantially as set forth.

8. In a device of the character described, a riding wheel, a frame, a handle carried thereon, and a horizontal blade mounted on the frame at one end and horizontally disposed revolving cutting blades mounted to coöperate with the former blade in cutting, the outer ends of the said several blades being free, the revolving cutting blades having at their free ends a guard mounted beyond the free ends of all said blades, substantially as set forth.

In testimony whereof I affix my signature in presence of two witnesses.

HARRY WATKINS.

Witnesses:
HENRY M. LOVE,
ELEANOR T. DE GIORGI.